US008887393B2

(12) United States Patent
Ciminelli et al.

(10) Patent No.: US 8,887,393 B2
(45) Date of Patent: Nov. 18, 2014

(54) FABRICATION OF AN INKJET PRINTHEAD MOUNTING SUBSTRATE

(75) Inventors: Mario Joseph Ciminelli, Rochester, NY (US); Dwight John Petruchik, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 153 days.

(21) Appl. No.: 13/359,902

(22) Filed: Jan. 27, 2012

(65) Prior Publication Data

US 2013/0193105 A1 Aug. 1, 2013

(51) Int. Cl.
*B21D 53/76* (2006.01)
*B23P 17/00* (2006.01)
*B41J 2/135* (2006.01)

(52) U.S. Cl.
USPC ........................................... 29/890.1; 347/44

(58) Field of Classification Search
CPC ...... B41J 2/1603; B41J 2/1626; B41J 2/1631; B41J 2/1623
USPC ........................................... 29/890.1; 347/44
See application file for complete search history.

(56) References Cited

U.S. PATENT DOCUMENTS

| | | | | | |
|---|---|---|---|---|---|
| 4,714,804 | A | * | 12/1987 | Yasuda et al. | 200/11 DA |
| 5,030,971 | A | * | 7/1991 | Drake et al. | 347/57 |
| 5,412,410 | A | * | 5/1995 | Rezanka | 347/15 |
| 5,570,118 | A | * | 10/1996 | Rezanka et al. | 347/43 |
| 6,030,065 | A | * | 2/2000 | Fukuhata | 347/15 |
| 6,293,647 | B2 | * | 9/2001 | Saijo | 347/24 |
| 6,315,389 | B1 | * | 11/2001 | Torgerson et al. | 347/40 |
| 6,592,203 | B1 | * | 7/2003 | Bates et al. | 347/40 |
| 6,682,171 | B2 | * | 1/2004 | Otsuka | 347/43 |
| 6,869,166 | B2 | * | 3/2005 | Brugue et al. | 347/49 |
| 7,325,309 | B2 | * | 2/2008 | Strand et al. | 29/890.1 |
| 7,350,902 | B2 | * | 4/2008 | Dietl et al. | 347/43 |
| 7,416,270 | B2 | * | 8/2008 | Sugahara | 347/19 |
| 7,503,640 | B2 | * | 3/2009 | Sugahara et al. | 347/40 |
| 7,979,987 | B2 | * | 7/2011 | Strand et al. | 29/890.1 |
| 8,336,982 | B2 | * | 12/2012 | Vall et al. | 347/14 |
| 2003/0202045 | A1 | * | 10/2003 | Torgerson et al. | 347/43 |
| 2004/0138337 | A1 | * | 7/2004 | Hasegawa et al. | 523/160 |
| 2008/0149024 | A1 | * | 6/2008 | Petruchik et al. | 118/300 |
| 2013/0193105 | A1 | * | 8/2013 | Ciminelli et al. | 216/20 |

* cited by examiner

*Primary Examiner* — David Angwin
(74) *Attorney, Agent, or Firm* — Peyton C. Watkins

(57) ABSTRACT

A method of fabricating a mounting substrate forming an ink inlet in a first layer of a first dielectric; forming contact pads on a second layer of a second dielectric; forming a slot through the second layer; forming a window through a third layer of a third dielectric; aligning and laminating the second layer to the first layer such that the ink inlet is aligned with the slot; and aligning and laminating the third layer to the second layer so the contact pads and the slot are exposed through the window; providing a printhead die having: a drop mechanism for ejecting drops; a chamber to contain ink; and adhesively bonding the printhead die to the second layer so that the printhead die is disposed within the window and an inlet feed opening of the printhead die is aligned with the slot through the second layer.

11 Claims, 22 Drawing Sheets

FABRICATION OF AN INKJET PRINTHEAD MOUNTING SUBSTRATE

CROSS REFERENCE TO RELATED APPLICATION

Reference is made to commonly assigned, co-pending U.S. patent application Ser. No. 13/359,884, filed Jan. 27, 2012, entitled "Inkjet Printhead With Multi-Layer Mounting Substrate" by Mario Ciminelli and Dwight Petruchik, the disclosure of which is herein incorporated by reference.

FIELD OF THE INVENTION

This invention relates generally to the field of inkjet printheads, and more particularly to a mounting substrate for the inkjet ejector die of the printhead.

BACKGROUND OF THE INVENTION

A mounting substrate for a liquid ejection device, such as an inkjet printhead, has conventionally been made by an insert molding process that forms both the die-attach portion for the liquid ejection device(s), including the fluid feed channels or slots with lands there between, and a housing portion including alignment and fastening features, such as bolt holes. Such a mounting substrate is described in U.S. Patent Application Publication 2008/0149024 (incorporated herein by reference). Affixed to such a mounting substrate are typically one or more inkjet ejector die, an electrical lead pattern (such as a flex circuit) for providing electrical interconnection to the inkjet ejector die, and a manifold for providing fluid connection between the tight spacings of the fluid feed channels and the wider spacings of the ink tanks. In addition, after electrical connection between the inkjet ejector die and the electrical lead pattern has been provided, for example by wirebonding, encapsulation is deposited over the interconnection region for mechanical and environmental protection.

Although the mounting substrate described in U.S. Patent Application Publication 2008/0149024 works satisfactory, in some applications it would be preferred to have fewer discrete parts. Fewer parts enable manufacturing simplicity that has fewer assembly steps. In addition, a configuration having fewer interfaces between discrete assembled parts can have fewer potential points of failure, so reliability is improved. Furthermore, it has been found that protection of the nozzle face of the ejector die from inadvertent collisions with the recording medium can also be important to printhead reliability Consequently, a need exists for a mounting substrate that incorporates electrical leads, protection of the nozzle face, and fluidic connection to the ejector die, provided in a simple integrated and low-cost fashion.

SUMMARY OF THE INVENTION

A method of fabricating a mounting substrate for a printhead die of an inkjet printhead, the method includes: forming an ink inlet hole in a first layer of a first dielectric material; patterning a plurality of electrical contact pads on a second layer of a second dielectric material; forming a slot through the second layer; forming a window through a third layer of a third dielectric material; aligning and laminating the second layer to the first layer such that the ink inlet hole is aligned with the slot; and aligning and laminating the third layer to the second layer such that the contact pads and the slot are exposed through the window.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
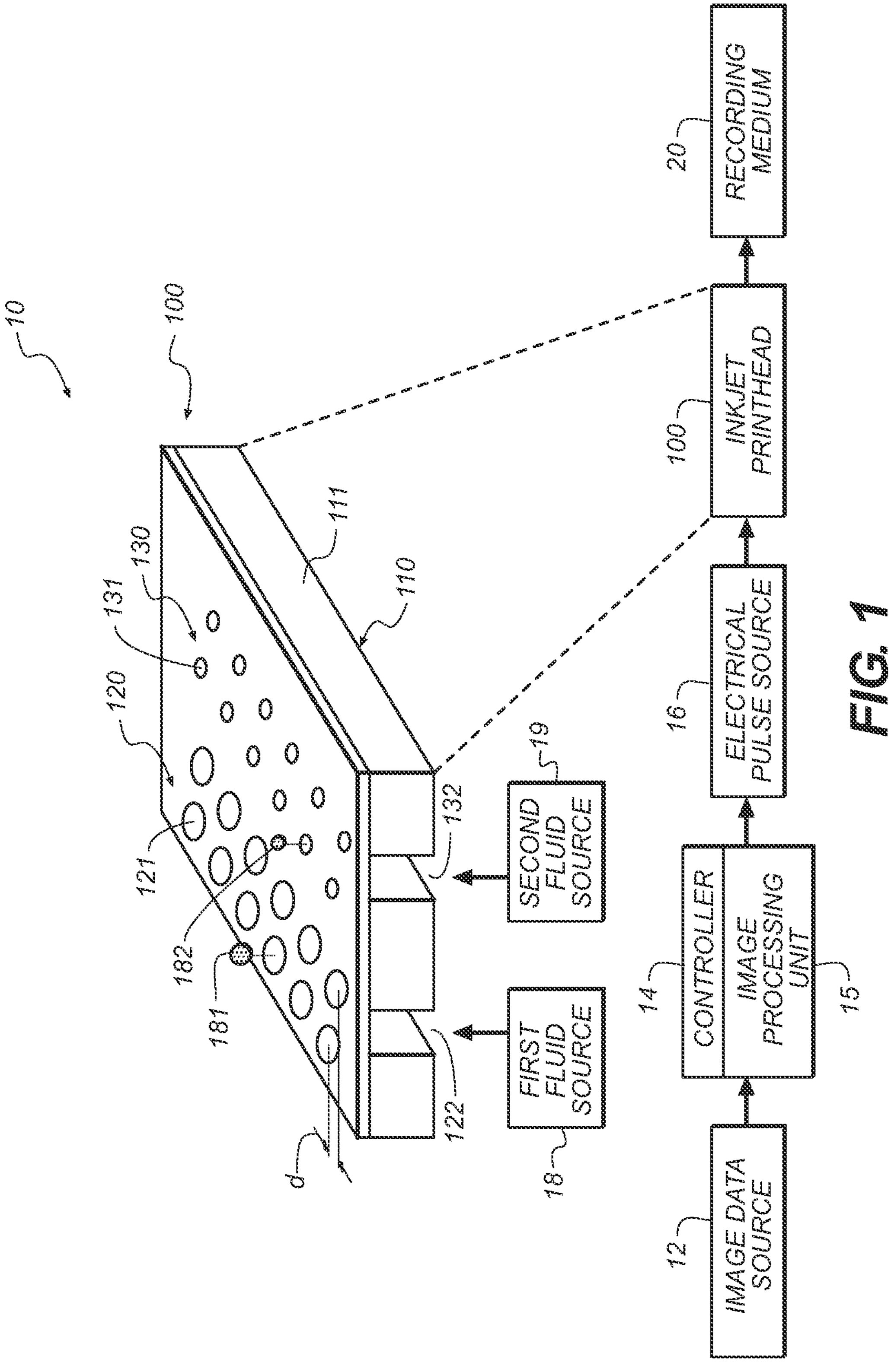
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays 120, 130. Nozzles 121 in the first nozzle array 120 have a larger opening area than nozzles 131 in the second nozzle array 130. In this example, each of the two nozzle arrays 120, 130 has two staggered rows of nozzles 121, 131, each row having a nozzle density of 600 per inch. The effective nozzle density then in each nozzle array 120, 130 is 1200 per inch (i.e. d=1/1200 inch in FIG. 1). If pixels on a recording medium 20 were sequentially numbered along the paper advance direction, the nozzles 121, 131 from one row of a nozzle array 120, 130 would print the odd numbered pixels, while the nozzles 121, 131 from the other row of the nozzle array 120, 130 would print the even numbered pixels.

In fluid communication with each nozzle array 120, 130 is a corresponding ink delivery pathway 122. Ink delivery pathway 122 is in fluid communication with the first nozzle array 120, and an ink delivery pathway 132 is in fluid communication with the second nozzle array 130. Portions of ink delivery pathways 122 and 132 are shown in FIG. 1 as openings through a printhead die substrate 111. One or more inkjet printhead die 110 will be included in inkjet printhead 100, but for greater clarity only one inkjet printhead die 110 is shown in FIG. 1. The printhead die 110 are arranged on a mounting substrate member as discussed below relative to FIG. 2. In FIG. 1, a first fluid source 18 supplies ink to first nozzle array 120 via ink delivery pathway 122, and a second fluid source 19 supplies ink to second nozzle array 130 via ink delivery pathway 132. Although distinct fluid sources 18 and 19 are shown, in some applications it can be beneficial to have a single fluid source supplying ink to both the first nozzle array 120 and the second nozzle array 130 via ink delivery pathways 122 and 132 respectively. Also, in some embodiments, fewer than two or more than two nozzle arrays 120, 130 can be included on printhead die 110. In some embodiments, all nozzles 121, 131 on inkjet printhead die 110 can be the same size, rather than having multiple sized nozzles on inkjet printhead die 110.

Not shown in FIG. 1, are the drop forming mechanisms associated with the nozzles 121, 131. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on the recording medium 20.

Figure 23:
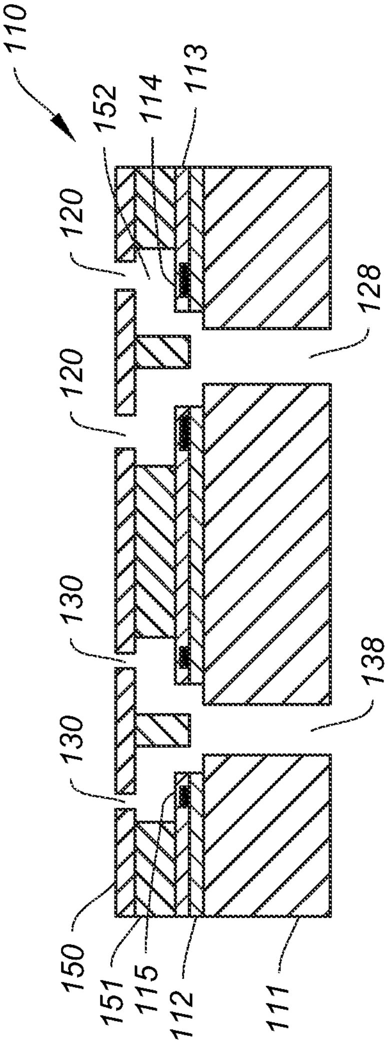
FIG. 23 is a cross section of the printhead die shown in FIG. 1.

FIG. 23 shows a cross-section of the printhead die 110 (also called a fluid ejection device 110 in U.S. Pat. No. 7,350,902), which is also shown in FIG. 2B of U.S. Pat. No. 7,350,902. The fluid ejection device or printhead die 110 includes a substrate 111 on which is formed a plurality of layers. There can be an isolation layer 112 directly over substrate 111. One or more layers 113 form the drop forming mechanism, such as heater 115 corresponding to a nozzle 131 in second nozzle array 130, and heater 114 corresponding to a nozzle 121 in first nozzle array 120. One or more chamber forming layers 151 are patterned to provide chambers (such as 152) to contain the fluid, such as ink, near the drop forming mechanism. Over the chamber forming layer or layers 151 is the nozzle plate layer 150, in which are patterned the nozzle arrays 120 and 130. Typically there is a nozzle for each chamber 152. The fluid (ink) delivery pathway 122 (see FIG. a) supplying fluid (ink) to first nozzle array 120 consists of the slot 128 in substrate 111, plus any passageways in the layers on the substrate leading to the chambers 152 for nozzles array 120. The fluid (ink) delivery pathway 132 (see FIG. 1) supplying fluid to second nozzle array 130 consists of the slot 138 in substrate 111, plus any passageways in the layers on the substrate leading to the fluid chambers for nozzle array 130.

Figure 2:
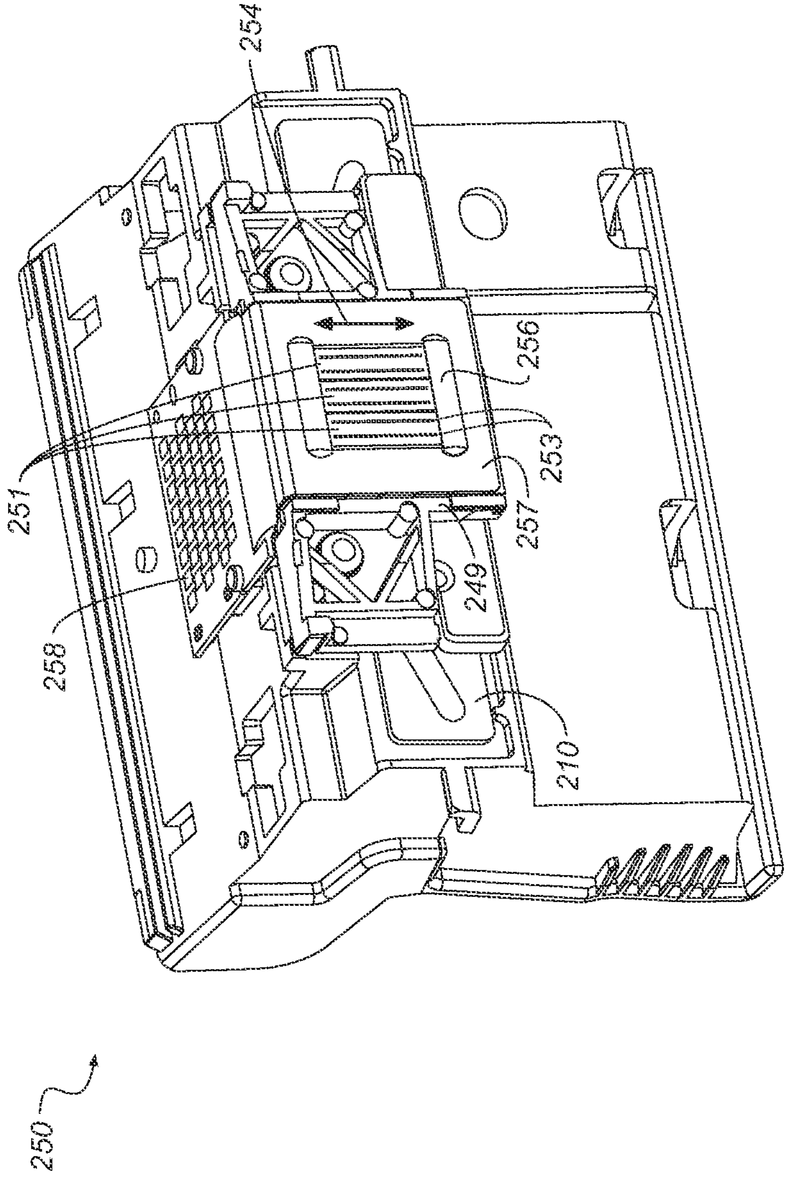
FIG. 2 is a perspective of a portion of a printhead.

FIG. 2 shows a perspective of a portion of a printhead 250, which is an example of an inkjet printhead 100. Printhead 250 includes three printhead die 251 (similar to printhead die 110 in FIG. 1), each printhead die 251 containing two nozzle arrays 253, so that printhead 250 contains six nozzle arrays 253 altogether. For an inkjet printhead, the terms printhead die and ejector die will be used herein interchangeably. The six nozzle arrays 253 in this example can each be connected to separate ink sources (not shown in FIG. 2); such as cyan, magenta, yellow, text black, photo black, and a colorless protective printing fluid. Each of the six nozzle arrays 253 is disposed along nozzle array direction 254, and the length of each nozzle array 120, 130 along a nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving printhead 250 across the recording medium 20 (FIG. 1). Following the printing of a swath, the recording medium 20 is advanced along a media advance direction that is substantially parallel to nozzle array direction 254.

Figure 3:
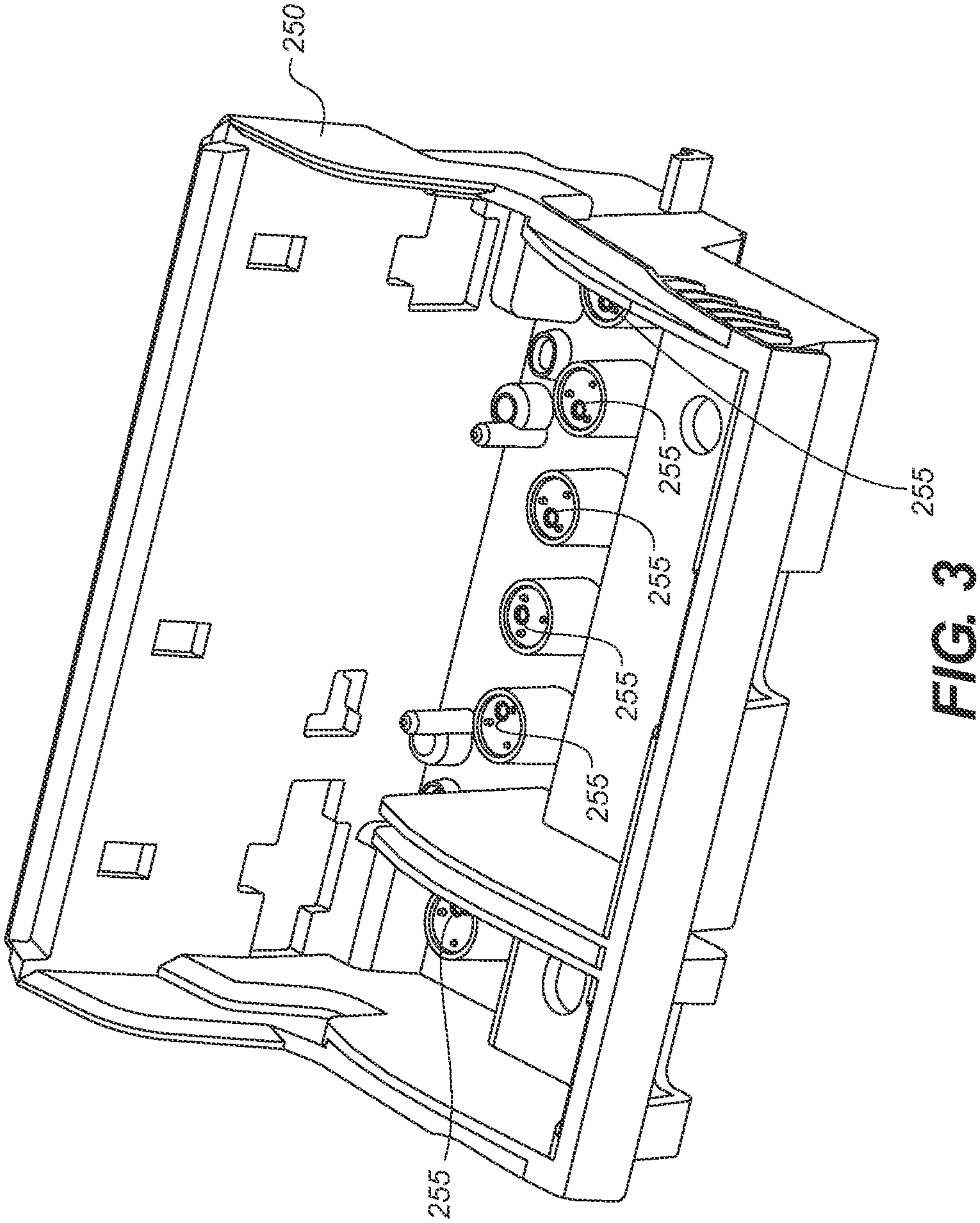
FIG. 3 is a perspective of a portion of a printhead that is rotated from the view of FIG. 2.

FIG. 3 shows a perspective of printhead 250, which is rotated relative to the view of FIG. 2, so that the ink inlet ports 255 can be seen. Ink inlet ports 255 connect to disconnectable ink tanks as described below.

Figure 4:
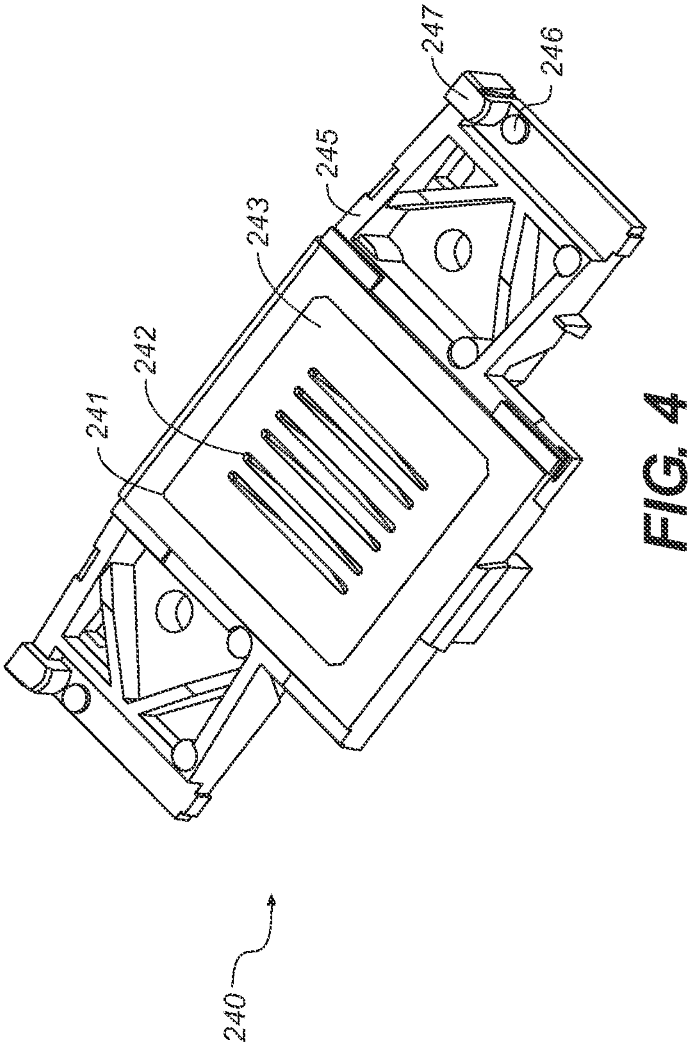
FIG. 4 (PRIOR ART)
FIG. 4 is a perspective of a prior art insert molded mounting substrate.

A prior art insert molded mounting substrate 240 described in U.S. Patent Application Publication 2008/0149024 is shown in more detail in FIG. 4 and is conventionally used as a mounting substrate 249 for the printhead die 251 in printhead 250. Referring to FIG. 4, an insert molded mounting substrate 240 includes a die mounting portion 241 and an extension 245. Die mounting portion 241 can be a ceramic piece that is inserted into an injection molding tool (not shown), so that extension 245 is molded around the ceramic insert. Die mounting portion 241 includes ink passageways that are shown as slots 242 that are exposed at a die mount surface 243. There are six slots 242 corresponding to the six nozzle arrays 253 of FIG. 2. Extension 245 optionally includes alignment features 246 and 247. Alignment features 246 and 247 are used to align printhead 250 to print carriage 200 (with reference to FIG. 6). Alignment features 246 define front to back and angular position of printhead die 251 relative to print carriage 200 while alignment features 247 define side to side position of printhead die 251 relative to the print carriage 200. During printhead assembly, printhead die 251 are affixed to die mounting portion 241 in such a way that the ink delivery pathways (such as slots 122 and 132 of FIG. 1) of printhead die 251 are fluidically connected and individually sealed to the slots 242.

Figure 5:
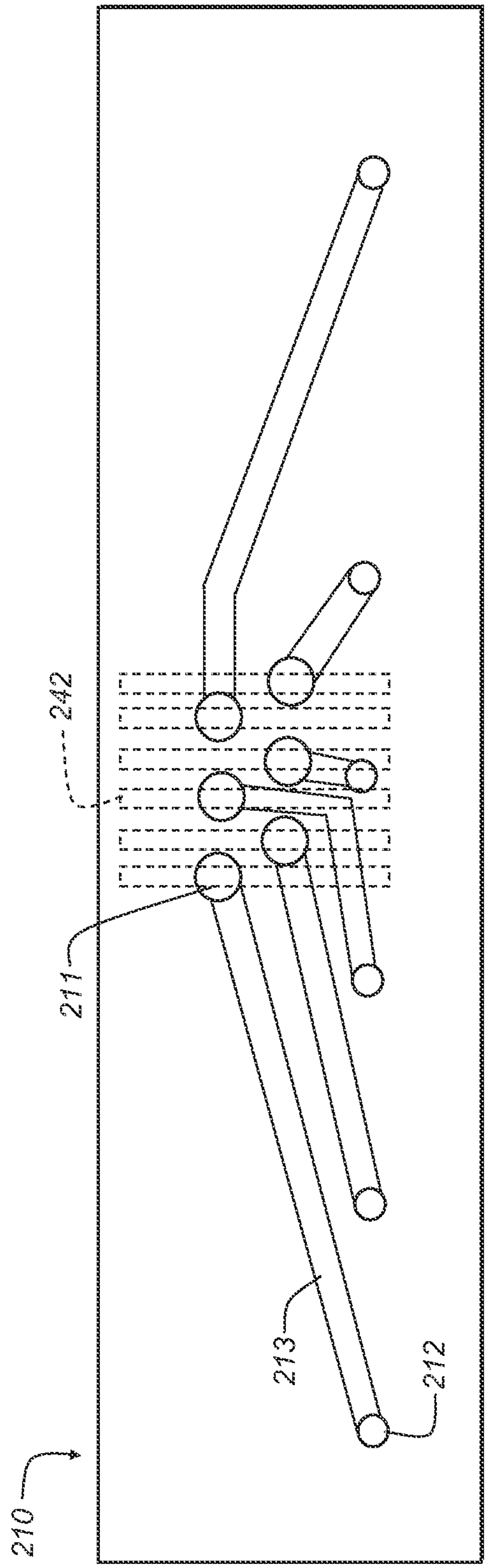
FIG. 5 is a top view of a manifold.

The example of FIG. 2 also includes a manifold 210 that is affixed (for example by laser welding) to printhead 250. FIG. 5 shows a schematic representation of manifold 210 in relation to slots 242 of die mounting portion 241. Manifold 210 transports the ink from the ink inlet ports 255 (see FIG. 3) of the printhead 250 to the corresponding slots 242 of the die mounting portion 241.

Since the ink inlet ports 255 are more widely spaced than the slots 242, each manifold passageway includes a slot connection end 211, a port connection end 212, and a fan-out path 213.

Referring briefly back to FIG. 2, a flex circuit 257 is shown to which the printhead die 251 are electrically interconnected, for example, by wire bonding or TAB bonding. The interconnections are covered by an encapsulating material 256 to protect them. Flex circuit 257 bends around the side of printhead 250 and connects to a connector board 258. When printhead 250 is mounted into the carriage 200 (see FIG. 6), connector board 258 is electrically connected to a connector (not shown) on the carriage 200, so that electrical signals can be transmitted to the printhead die 251.

Figure 6:
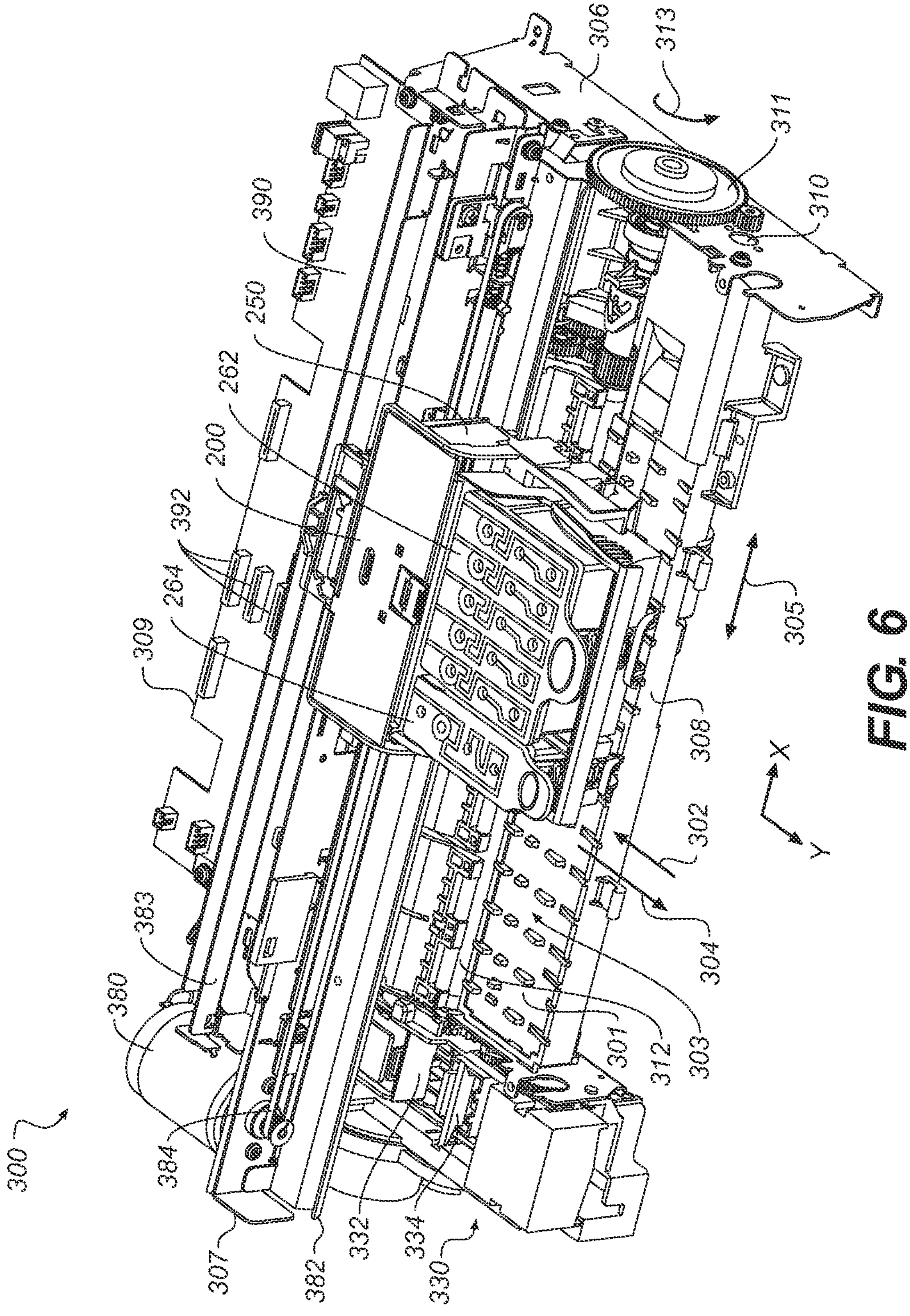
FIG. 6 is a perspective of a portion of a carriage printer.

FIG. 6 shows a portion of a desktop carriage printer. Some of the parts of the printer have been hidden in the view shown in FIG. 6 so that other parts can be more clearly seen. A printer chassis 300 has a print region 303 across which carriage 200 is moved back and forth in a carriage scan direction 305 along the X axis, between the right side 306 and the left side 307 of printer chassis 300, while drops are ejected from printhead die 251 (not shown in FIG. 6) on printhead 250 that is mounted on carriage 200. A platen 301 (which optionally includes ribs) supports recording medium 20 (FIG. 1) in print region 303. A carriage motor 380 moves a belt 384 to move carriage 200 along a carriage guide rail 382. An encoder sensor (not shown) is mounted on carriage 200 and indicates carriage location relative to an encoder fence 383.

Printhead 250 is mounted in carriage 200, and a multi-chamber ink supply 262 and a single-chamber ink supply 264 are mounted in the printhead 250. The mounting orientation of printhead 250 is rotated relative to the view in FIG. 2, so that the printhead die 251 are located at the bottom side of printhead 250, the droplets of ink being ejected downward toward platen 301 in print region 303 in the view of FIG. 6. Multi-chamber ink supply 262, in this example, contains five ink sources: cyan, magenta, yellow, photo black, and colorless protective fluid; while single-chamber ink supply 264 contains the ink source for text black. Paper or other recording medium (sometimes generically referred to as paper or media herein) is loaded along a paper load entry direction 302 toward the front 308 of printer chassis 300.

Figure 7:
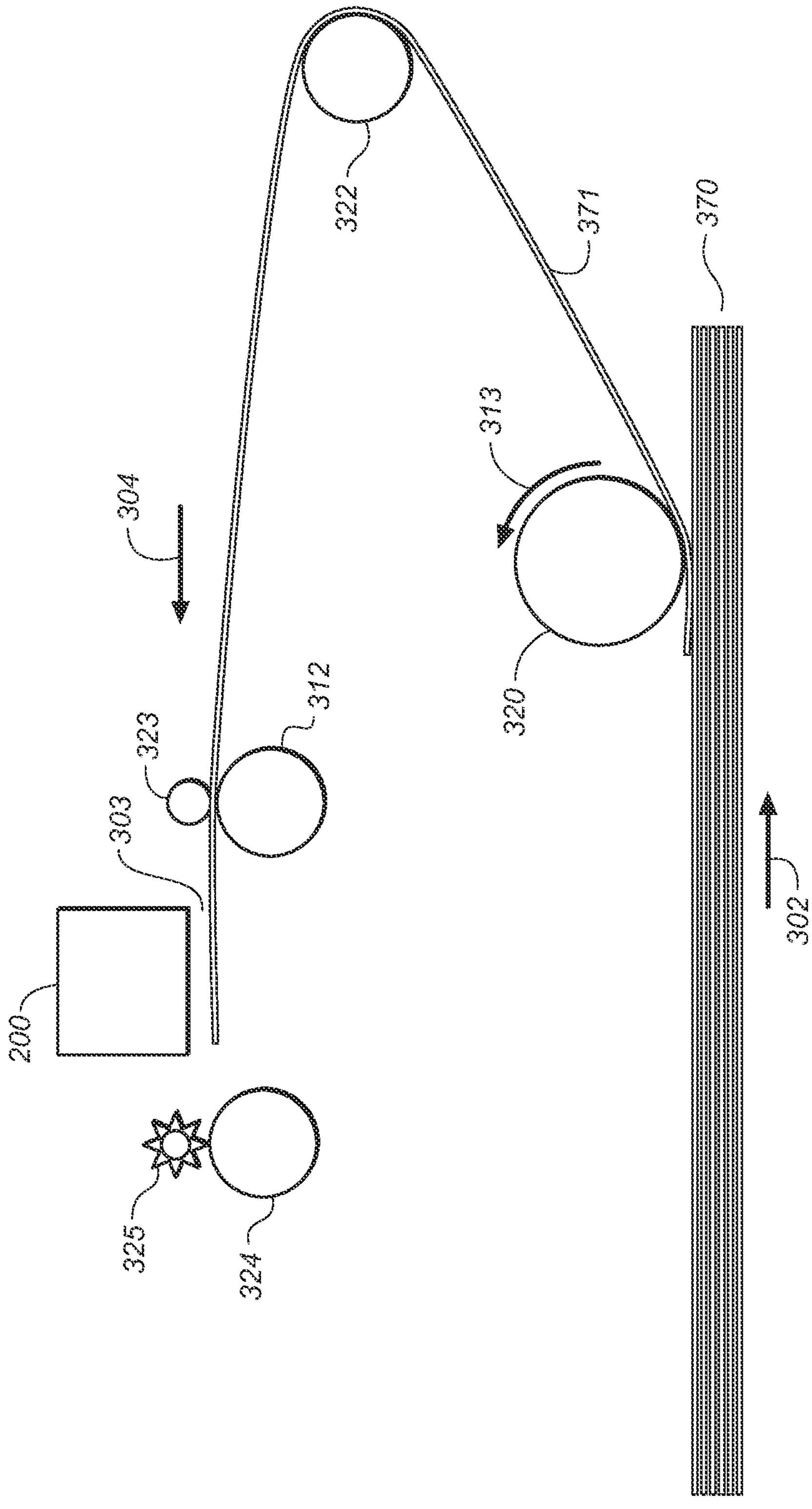
FIG. 7 is a schematic side view of an exemplary paper path in a carriage printer.

A variety of rollers are used to advance the medium through the printer as shown schematically in the side view of FIG. 7. In this example, a pick-up roller 320 moves a top piece or sheet 371 of a stack 370 of paper or other recording medium in the direction of arrow, paper load entry direction 302. A turn roller 322 acts to move the paper around a C-shaped path (in cooperation with a curved rear wall surface) so that the paper continues to advance along a media advance direction 304 from the rear 309 of the printer chassis 300 (with reference also to FIG. 6). The paper is then moved by a feed roller 312 and an idler roller(s) 323 to advance along the Y axis across print region 303, and from there to a discharge roller 324 and star wheel(s) 325 so that printed paper exits along media advance direction 304. Feed roller 312 includes a feed roller shaft along its axis, and a feed roller gear 311 (see FIG. 6) is mounted on the feed roller shaft. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller 312.

Referring to FIG. 6, the motor that powers the paper advance rollers is not shown, but a hole 310 at the right side 306 of the printer chassis 300 is where the motor gear (not shown) protrudes through in order to engage feed roller gear 311, as well as the gear for the discharge roller (not shown). Referring to FIG. 7, for normal paper pick-up and feeding, it is desired that all rollers rotate in forward rotation direction 313. Referring back to FIG. 6, toward the left side of the printer chassis 307 is a maintenance station 330 including a cap 332 and a wiper 334.

Toward the rear 309 of the printer chassis 300, in this example, is located an electronics board 390, which includes cable connectors 392 for communicating via cables (not shown) to the printhead carriage 200 and from there to the printhead 250. Also on the electronics board 390 are typically mounted motor controllers for the carriage motor 380 and for the paper advance motor, a processor and/or other control electronics (shown schematically as controller 14 and image processing unit 15 in FIG. 1) for controlling the printing process, and an optional connector for a cable to a host computer.

Figure 8:
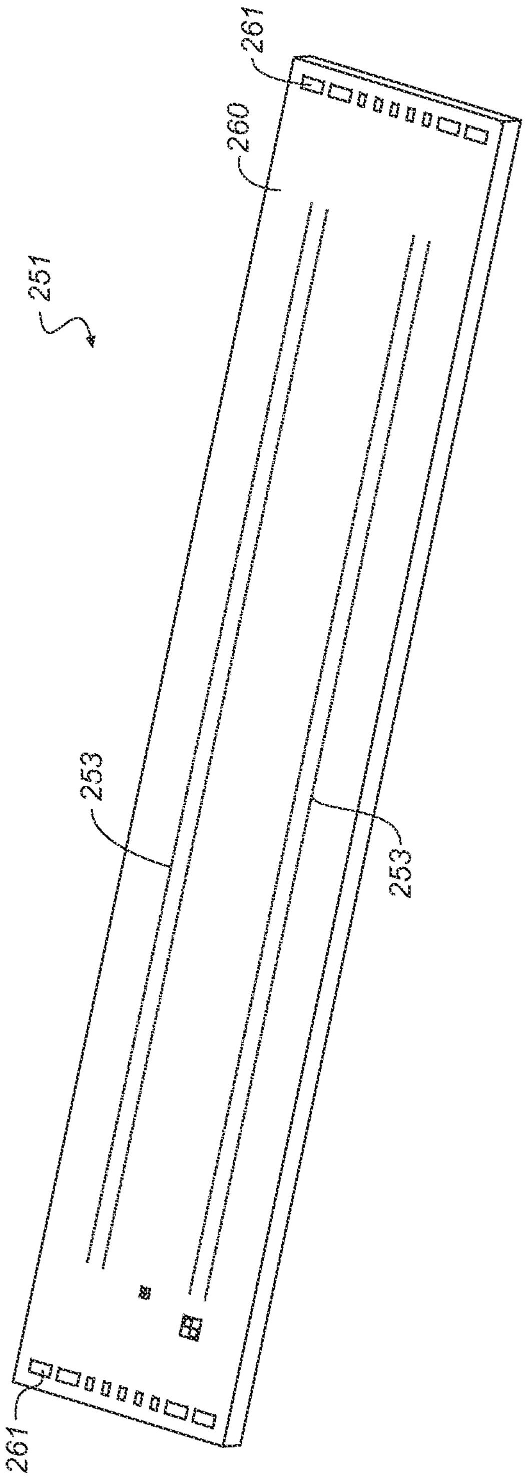
FIG. 8 is a perspective of the nozzle array side of a printhead die.
Figure 9:
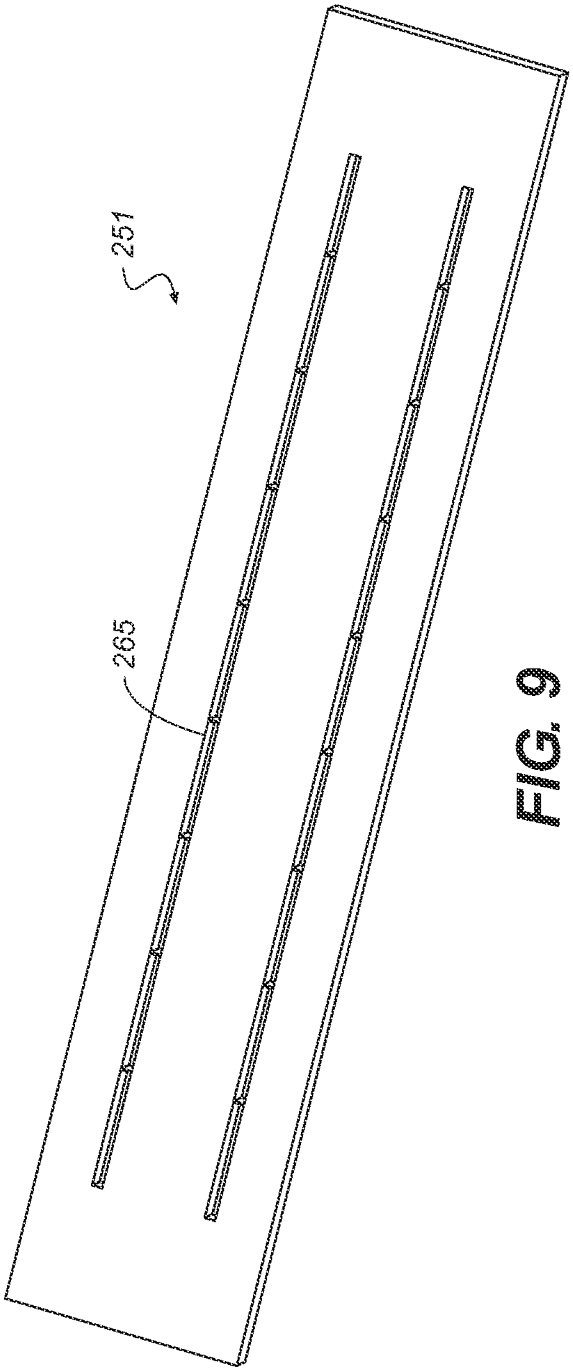
FIG. 9 is a perspective of the ink feed opening side of a printhead die.

Aspects of the present invention involve replacing insert molded mounting substrate 240 and at least a portion of flex circuit 257 with a multi-layer substrate that includes at least one metalized layer for electrical interconnection, as well as layers including ink passageways and protection for the printhead die. FIGS. 8 and 9 respectively show perspectives of a nozzle array side and an ink feed opening side of an exemplary printhead die 251 that can be used with the present invention. In FIG. 8, a surface 260 including two nozzle arrays 253 is shown, as well as a plurality of bond pads 261 disposed at each end of printhead die 251. In FIG. 9, the two ink feed openings 265 are shown and that are respectively are in fluid communication with the two nozzle arrays 253 shown in FIG. 8. Various embodiments of the invention can accommodate various numbers of nozzle arrays 253.

Figure 10:
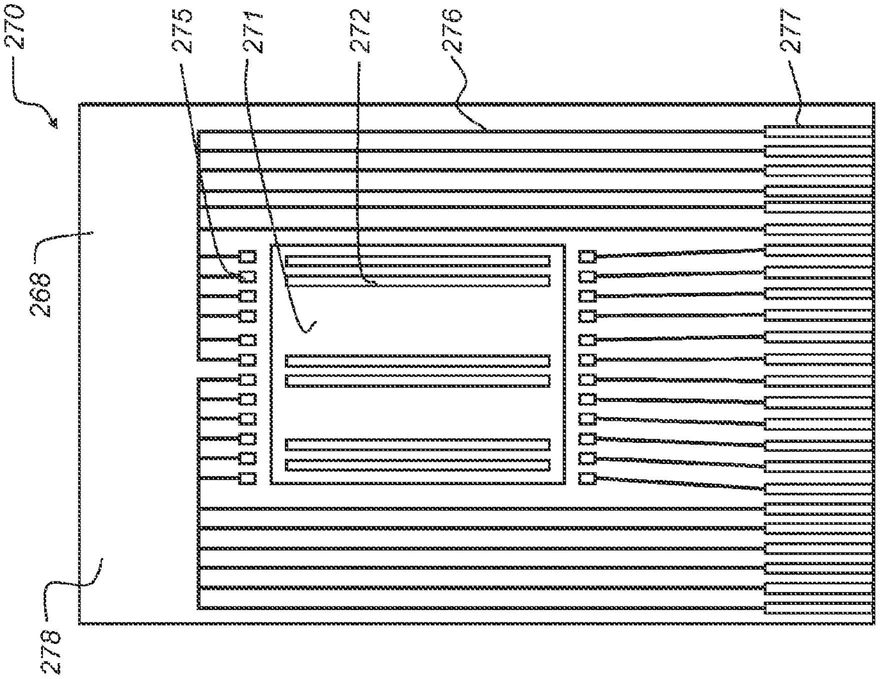
FIG. 10 is a schematic top view of a portion of a mounting substrate according to an embodiment of the invention.

FIG. 10 shows a schematic representation of a metalized layer 270 having metallization on a single side as a portion of a multi-layer mounting substrate for the printhead die 251 (see FIG. 2) that can be used in embodiments of the present invention. Metalized layer 270 has an electrically insulating support 268 such as FR4, BT, or ceramic on which electrically conductive features have been patterned on a first surface 278. For embodiments where metalized layer is formed using printed circuit technology, electrically insulating support 268 can be a dielectric material such as FR4 and BT, and the electrically conductive features can include layers of nickel, copper and gold, for example. For embodiments where the electrically insulating support 268 is ceramic, the electrically conductive features can be screen printed and fired, as is well known in the art. Metalized layer 270 includes a die mount region 271 on first surface 278 of electrically insulating support 268 for mounting printhead die 251. Fluid passageways are formed through the electrically insulating support 268 (extending from a second surface opposite the first surface 278 to the first surface 278) to bring ink to printhead die 251 (see FIG. 2). In the embodiment of FIG. 10 these fluid passageways include slots 272. The electrically conductive features include contact pads 275 for wire bonding to the printhead die 251, connection pads 277, and leads 276 to connect the contact pads 275 to corresponding connection pads 277.

Figure 11:
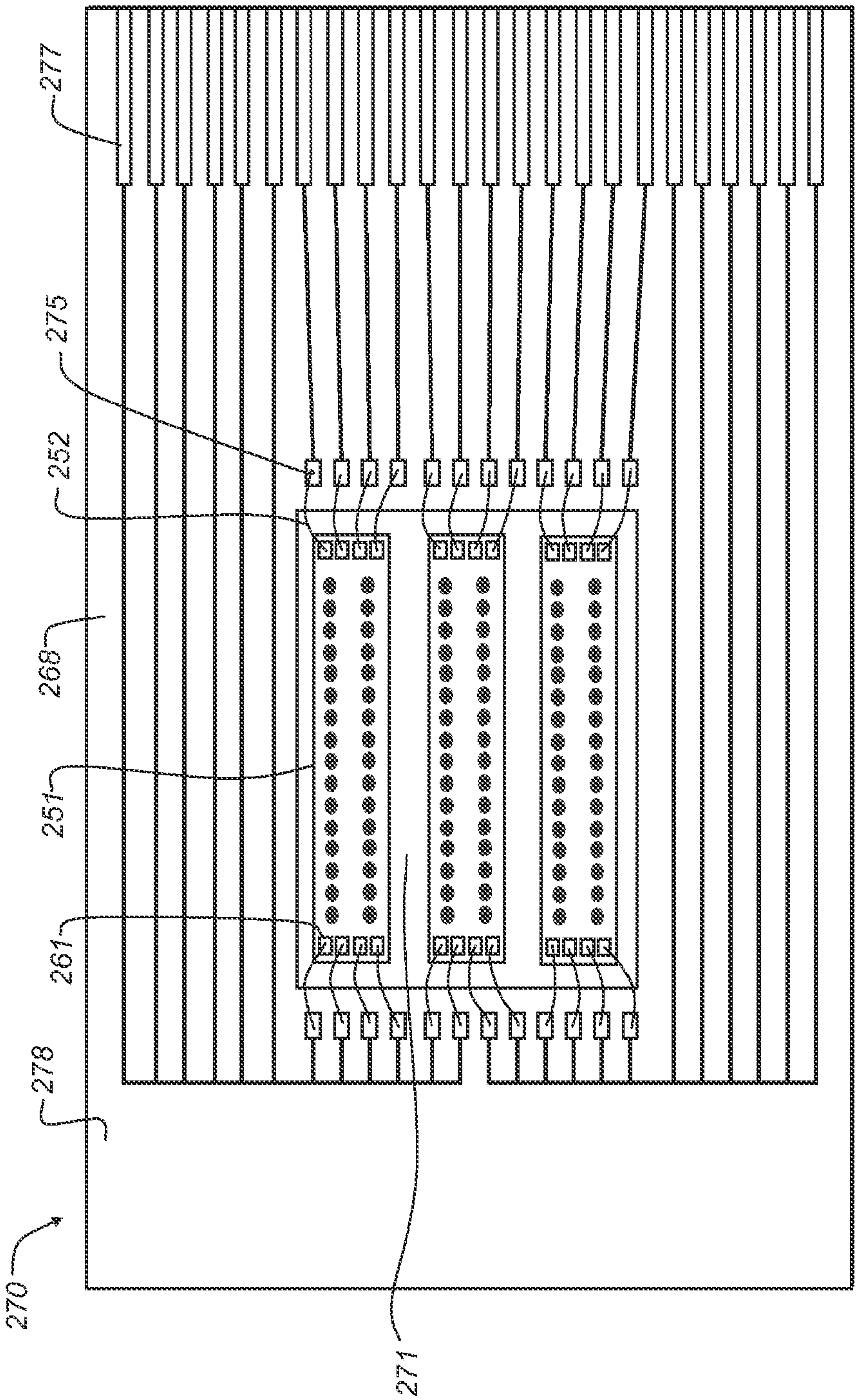
FIG. 11 is a schematic top view of printhead ejector die bonded to a the portion of the mounting substrate of FIG. 10.

FIG. 11 shows a schematic representation of three printhead die 251 having been die bonded to the metalized layer 270 (corresponding to a single sided metalized layer of FIG. 10 but rotated 90 degrees) in the die mount region 271. In addition wire bonds 252 are shown providing electrical interconnection between bond pads 261 on printhead die 251 and contact pads 275 on metalized layer 270.

Figure 12B:
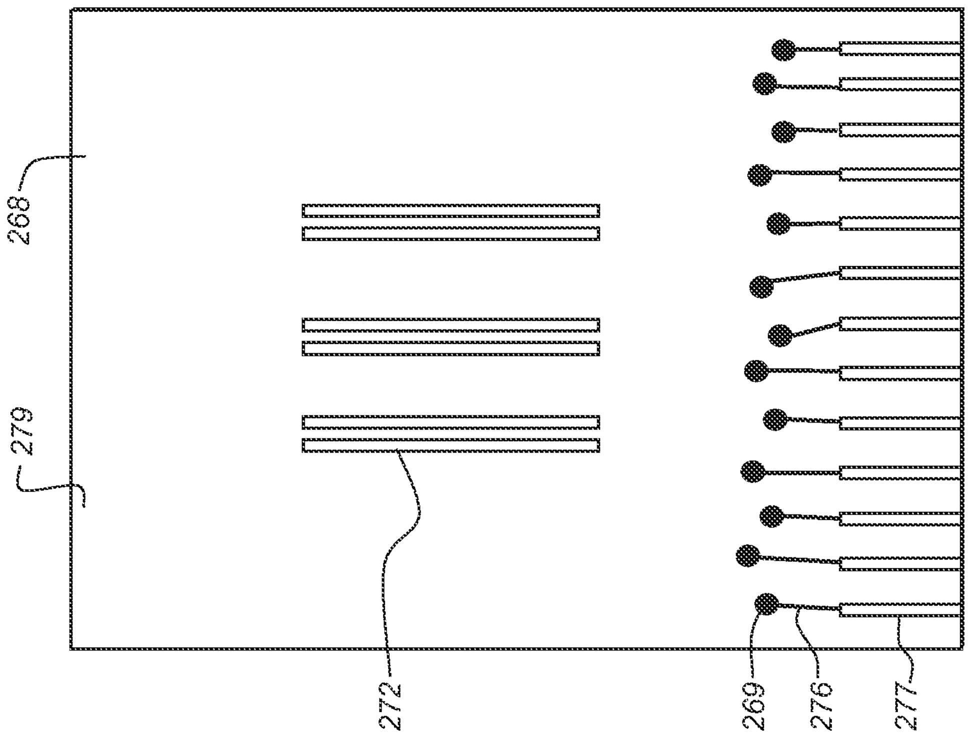
FIGS. 12A and 12B are schematic top and bottom views respectively of a portion of a mounting substrate with two-sided metallization according to an embodiment of the invention.
Figure 12A:
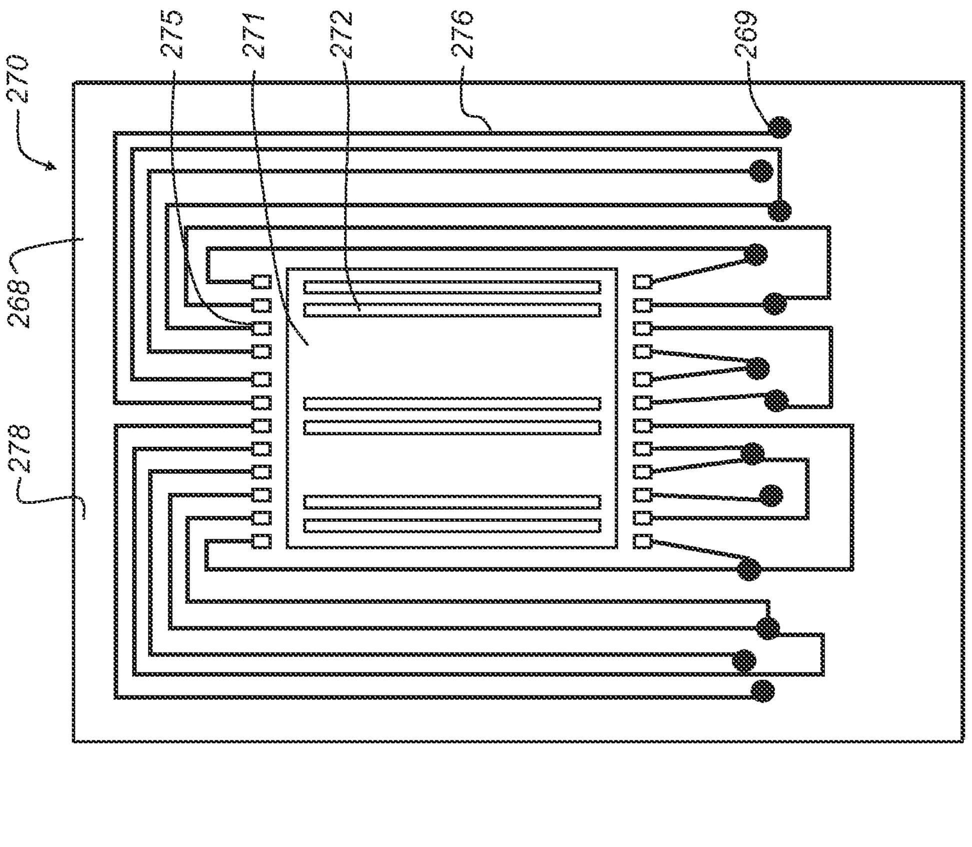

In the metalized layer 270 of FIG. 10, the electrically conductive features were only on first surface 278 of electrically insulating support 268. In other embodiments, double sided metalized layers 270 can be used, as shown in FIGS. 12A and 12B. FIG. 12A is a top view of double sided metalized layer 270, and FIG. 12B is a bottom view of the same double sided metalized layer. Metalized layer 270 has an electrically insulating support 268 such as FR4, BT, or ceramic on which electrically conductive features have been patterned on first surface 278 and also on a second surface 279. The electrically conductive features include contact pads 275 for wire bonding to the printhead die 251 on the first surface 278, connection pads 277 on the second surface 279, leads 276 to connect the bond pads 275 to corresponding connection pads 277, and metalized vias 269 to connect portions of leads 276 on the first surface 278 with portions of leads 276 on the second surface 279. In the example of FIGS. 12A and 12B, the double sided metallization enables connection pads 277 to be on the opposite side of the electrically insulating support 268 from the contact pads 275 (and also the printhead die 251, not shown in FIGS. 12A and 12B). In this example, there are also fewer connection pads 277 than in the examples of FIG. 10, because some leads have been electrically tied together. For example, the plurality of printhead die 251 can have multiple common leads, such as ground or logic voltage.

Figure 13:
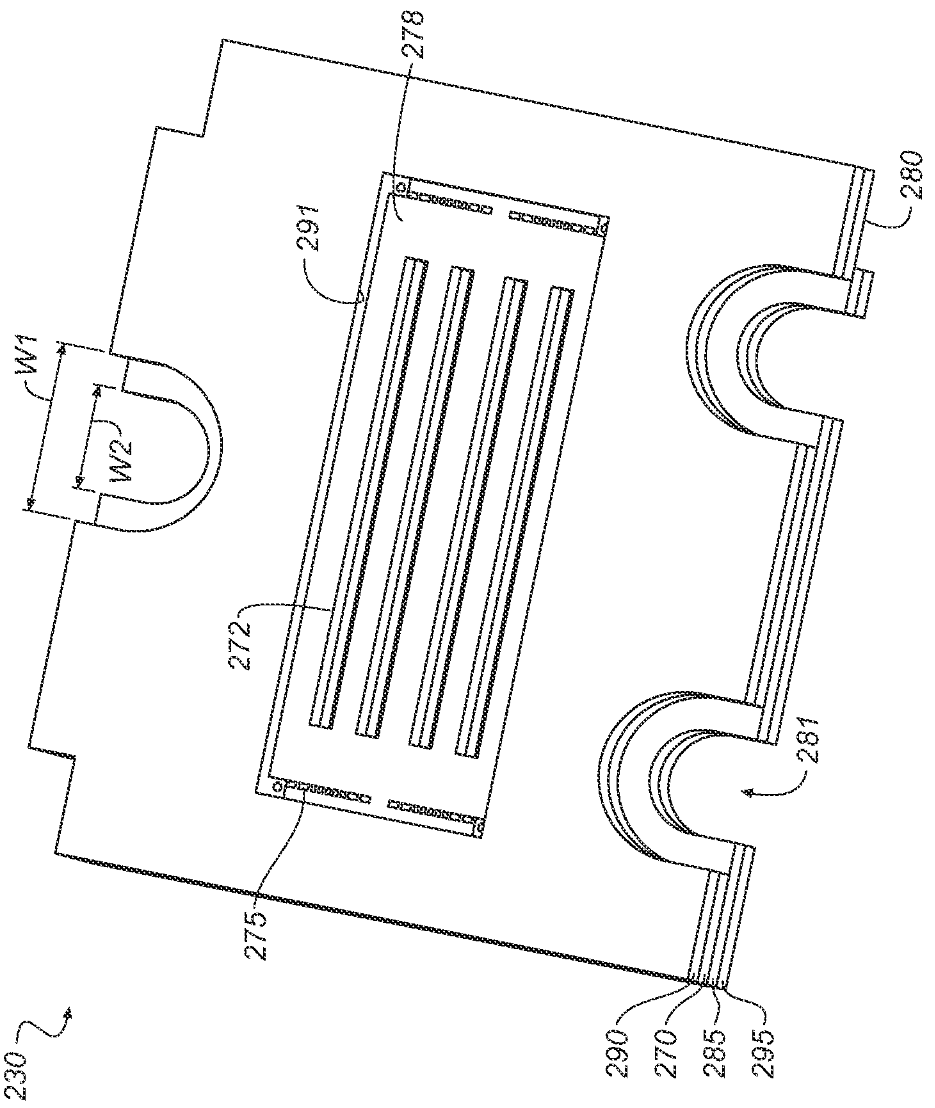
FIG. 13 is a perspective of a multi-layer mounting substrate from the face layer side according to an embodiment of the invention.

FIG. 13 shows a perspective of a multi-layer mounting substrate 230 according to an embodiment of the present invention. Four layers are shown in the example of FIG. 13. A face layer 290 and a base layer 295 form the outer layers of multi-layer mounting substrate 230. A metalized layer 270 (similar to the double-sided metalized layer of FIGS. 12A and 12B) and an ink passage layer 285 together form an intermediate layer. Herein, metalized layer 270 will also be referred to as a first intermediate layer and optional ink passage layer 285 will also be referred to as a second intermediate layer. Face layer 290 is located proximate first surface 278 of metalized layer 270. For embodiments of a four-layer substrate (as shown) where second intermediate layer 285 is included, base layer 295 is located adjacent second intermediate layer 285 which is adjacent second surface 279 (FIG. 15) of metalized layer 270. For embodiments of a three-layer substrate (not shown) where second intermediate layer 285 is not included, base layer 295 is located adjacent second surface 279 of metalized layer 270. Face layer 290 includes a window 291 and is aligned to metalized layer 270 such that contact pads 275 and slots 272 are exposed through window 291. However, at least a portion of the electrical leads 276 (FIG. 10) connected to contact pads 275 are covered by face layer 290. The example of FIG. 13 includes four slots 272 in order to feed ink to four nozzle arrays as described below. Face layer 290 and metalized layer 270 include an extension 280 that extends beyond ink passage layer 285 and base layer 295. As described below with reference to FIG. 15, connection pads 277 are disposed on extension 280. FIG. 13 also shows three mechanical mounting features 281 that can be used together with screws (not shown) to attach multi-layer mounting substrate as the mounting substrate 249 of a printhead similar to that shown in FIG. 2. Mounting features 281 have a first width W1 in face layer 290 and a second width W2 in base layer 295. W1 is larger that W2 so that W1 can accommodate the head of the screw, while W2 accommodates the shaft of the screw. In the example of FIG. 13, mounting features 281 also have a width equal to first width W1 in metalized layer 270 and a width equal to second width W2 in ink passage layer 285.

Figure 14:
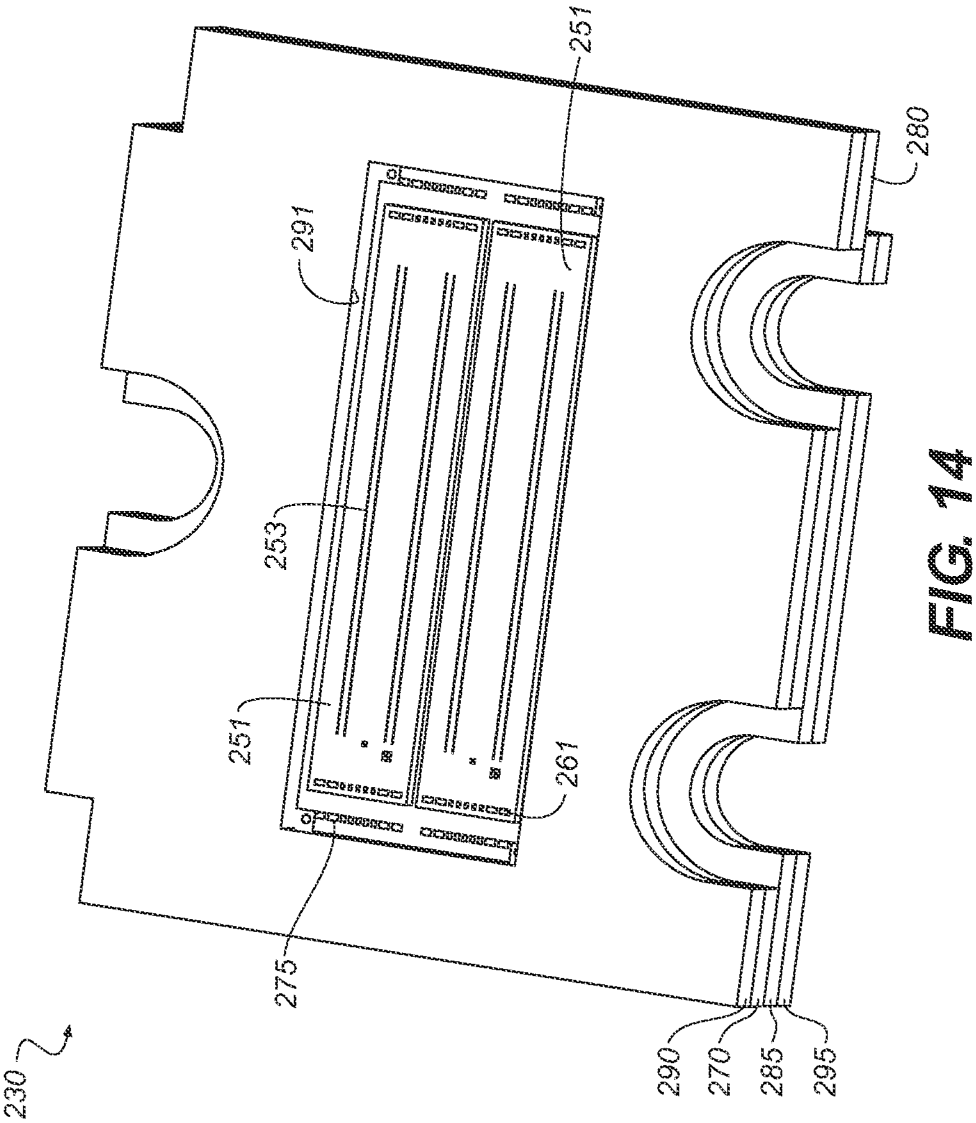
FIG. 14 is a perspective similar to that of FIG. 13 but also including two printhead die.

FIG. 14 shows a similar perspective of multi-layer mounting substrate 230 as FIG. 13 but also includes two printhead die 251 of the type shown in FIGS. 8 and 9 that are affixed to metalized layer 270 within window 291 of face layer 290. Since each printhead die 251 includes two nozzle arrays 253 and two corresponding ink feed openings 265 (FIG. 9), there are a total of four ink feed openings 265, corresponding to the four slots 272 shown in FIG. 13. The ink feed openings 265 are aligned with and in fluid communication with respective slots 272 (see FIG. 10) in the metalized layer 270. Wire bonds 252 (FIG. 11) electrically connect bond pads 261 on printhead die 251 to contact pads 275 on metalized layer 270. Printhead die 251 has a thickness that is equal to or substantially equal to the thickness of face layer 290. In that way, the nozzle face surface 280 of printhead die 251 is flush or substantially flush with the exterior surface of face layer 290. Such a configuration provides protection of nozzle face surface 280 from collisions with recording media as carriage 200 (FIG. 6) is moved back and forth. In particular for edges (such as dog-eared edges) of media that are raised relative to platen 301 (FIG. 6), the substantially flush mounting of surface 280 of printhead die 251 with the exterior of face layer 290 is configured to deflect such raised edges, thereby protecting the nozzle face at surface 280. The exterior of face layer 290 also provides a capping surface for cap 332 (FIG. 6) of maintenance station 330 to seal against.

Figure 15:
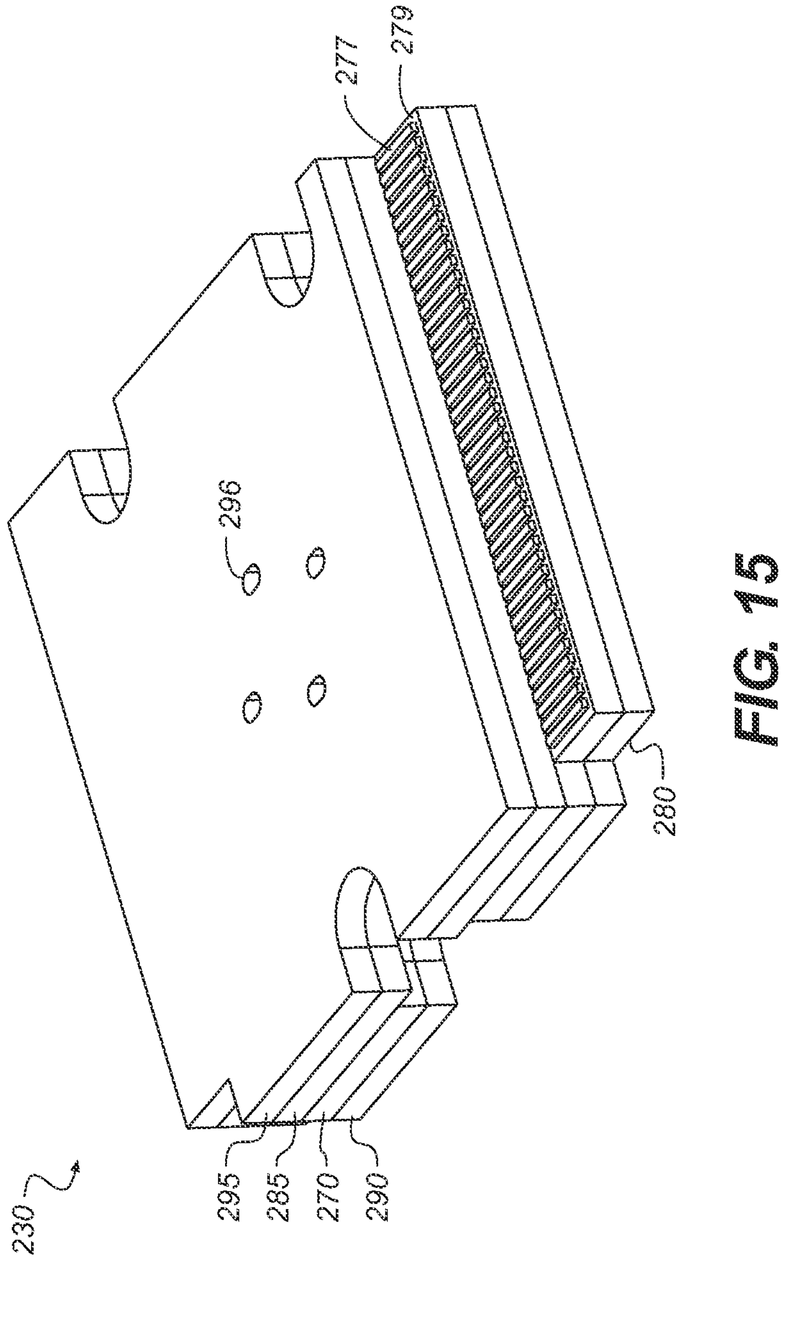
FIG. 15 is a perspective of the multi-layer mounting substrate of FIG. 13, but from the base layer side.

FIG. 15 shows a perspective of multi-layer substrate 230 from the opposite side as FIG. 13 so that base layer 295 is more clearly seen. Base layer 295 includes four inlet holes 296. Each inlet hole 296 is in fluid communication with and aligned with a corresponding slot 272 in metalized layer 270, as can be seen more clearly in FIG. 16. In a fully assembled printhead 250 similar to FIG. 2, each inlet hole 296 would be aligned with and in fluid communication with slot connection end 211 of a manifold 210 similar to FIG. 5, but having four slot connection ends 211 rather than six. Also seen in FIG. 15 are the connection pads 277 on second surface 279 of metalized layer 270. Connection pads 277 are disposed on extension 280 so that they are accessible for electrical connection to a flexible printed wiring member (not shown). Such a flexible printed wiring member has a function similar to flex circuit 257 of FIG. 2, enabling electrical connection between connection pads 277 on a surface parallel to printhead die 250 and a connector board 258 located on a surface that is perpendicular to printhead die 250.

Figure 16:
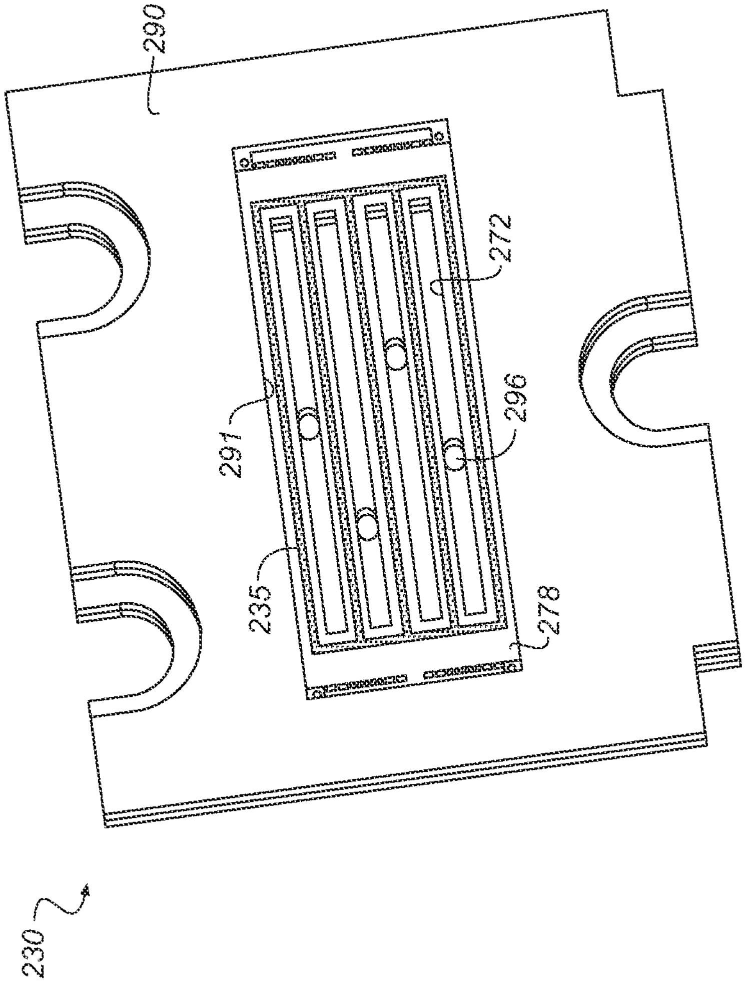
FIG. 16 is a perspective of the multi-layer mounting substrate of FIG. 13 but at a higher angle.

FIG. 16 shows a perspective similar to that of FIG. 13 but from a higher angle so that the alignment of inlet holes 296 with slots 272 can be seen. An adhesive 235 has been dispensed onto first surface 278 of metalized layer 270 in preparation for bonding printhead die 251 (FIG. 14). Adhesive 235 is dispensed in a pattern surrounding each slot 272 so that when printhead die 251 are bonded to first surface 278 of metalized layer 270 with each slot 272 aligned with a corresponding ink feed opening 265 (FIG. 9), adhesive 235 forms a fluid seal around the slot 272 and the ink feed opening 265, thereby preventing ink leaks or cross-contamination of inks.

Figure 17:
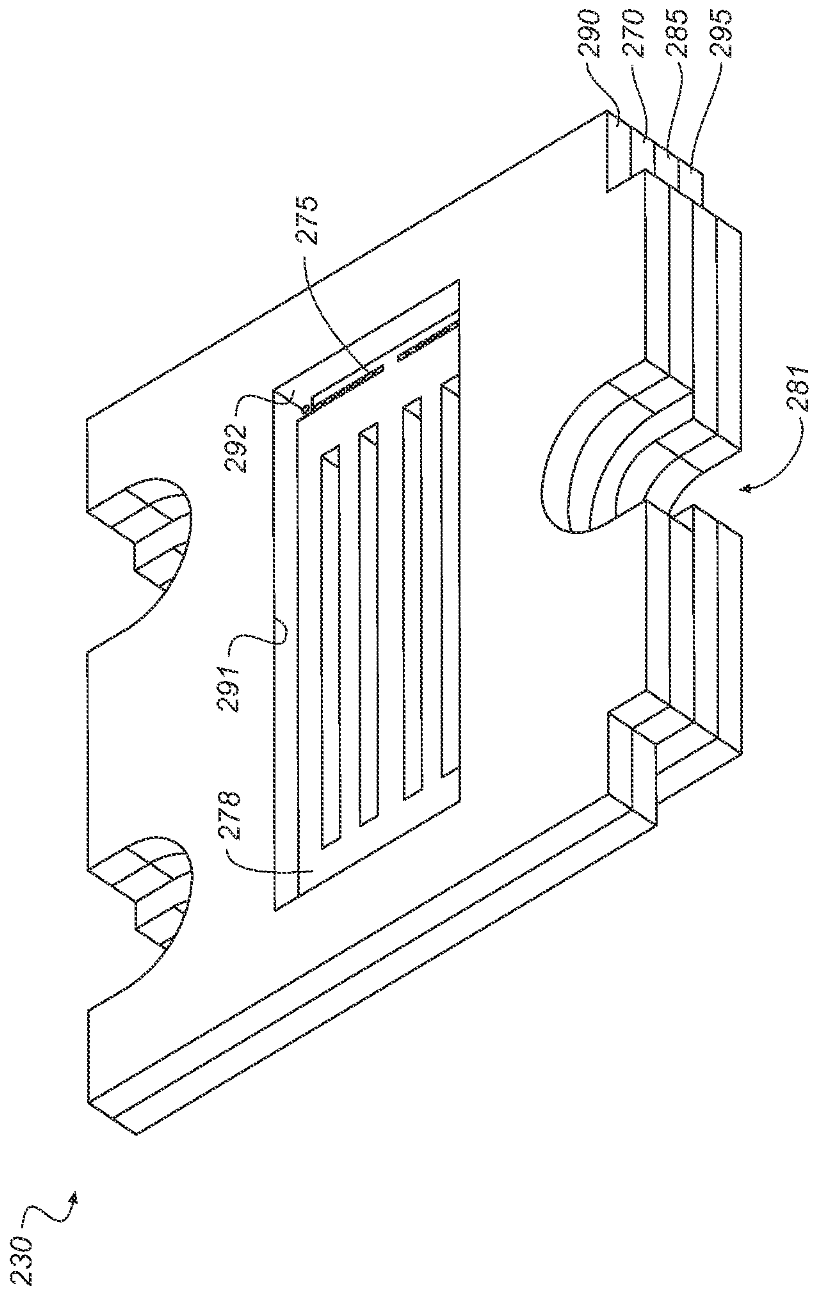
FIG. 17 is a perspective of the multi-layer mounting substrate of FIG. 13 but at a lower angle.

FIG. 17 shows a perspective similar to that of FIG. 13 but from a lower angle so that a wall 292 of window 291 of face layer 290 can be more clearly seen. After printhead die 251 (FIG. 14) have been adhesively bonded to first surface 278 of metalized layer 270 within window 291 and wire bonds 252 (FIG. 9) have been made between bond pads 261 and contact pads 275, an encapsulating material 256 (FIG. 2) is dispensed over the wire bonds 252, the bond pads 261 and the contact pads 275 to protect them from mechanical or environmental damage. Unlike the unconstrained flow of encapsulating material 256 as in FIG. 2, where the lateral flow is controlled by dispensing parameters, for multi-layer substrate 230, the lateral flow of encapsulating material 256 is constrained by wall 292. Multi-layer substrate 230 also provides contact pads 275 at a recessed location relative to bond pads 261 of printhead die 251. Such a configuration allows a low profile of the wire bonds 252 and the encapsulating material 256. This is beneficial because wiper 334 (FIG. 6) of maintenance station 330 is configured to contact the nozzle face surface 260 of printhead die 251, as well as face layer 290 of mounting substrate 230 and also encapsulating material 256.

Figure 18:
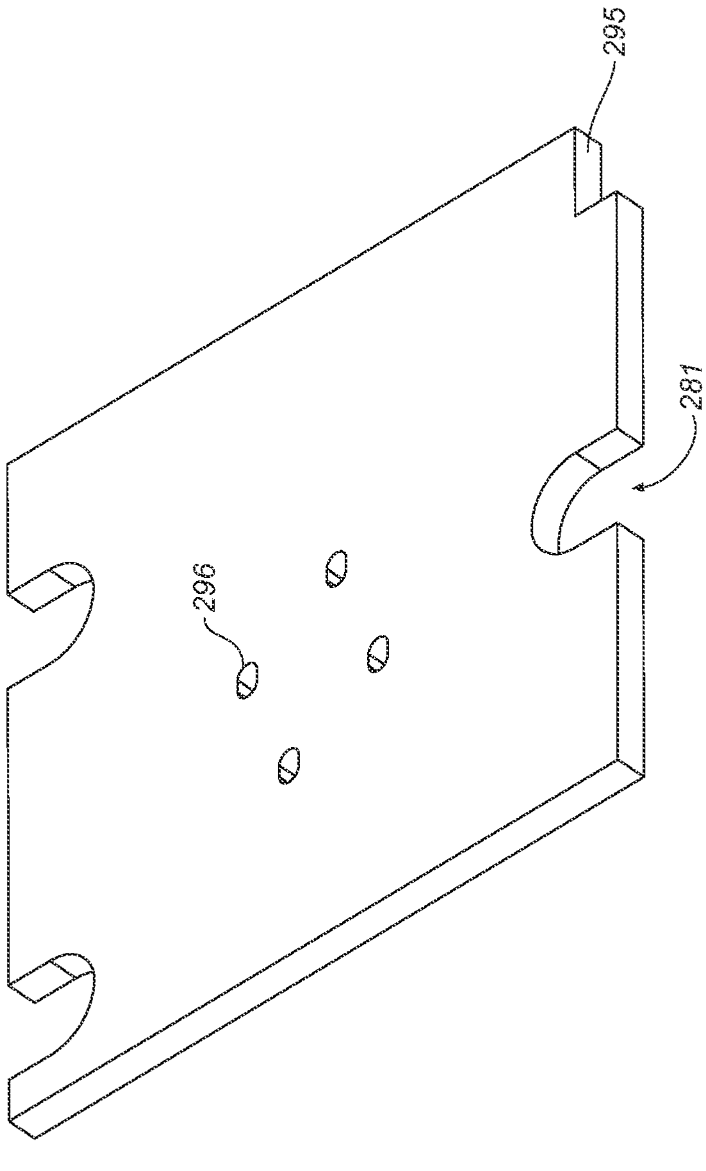
FIG. 18 is a perspective of the base layer of the multi-layer mounting substrate of FIG. 17.
Figure 19:
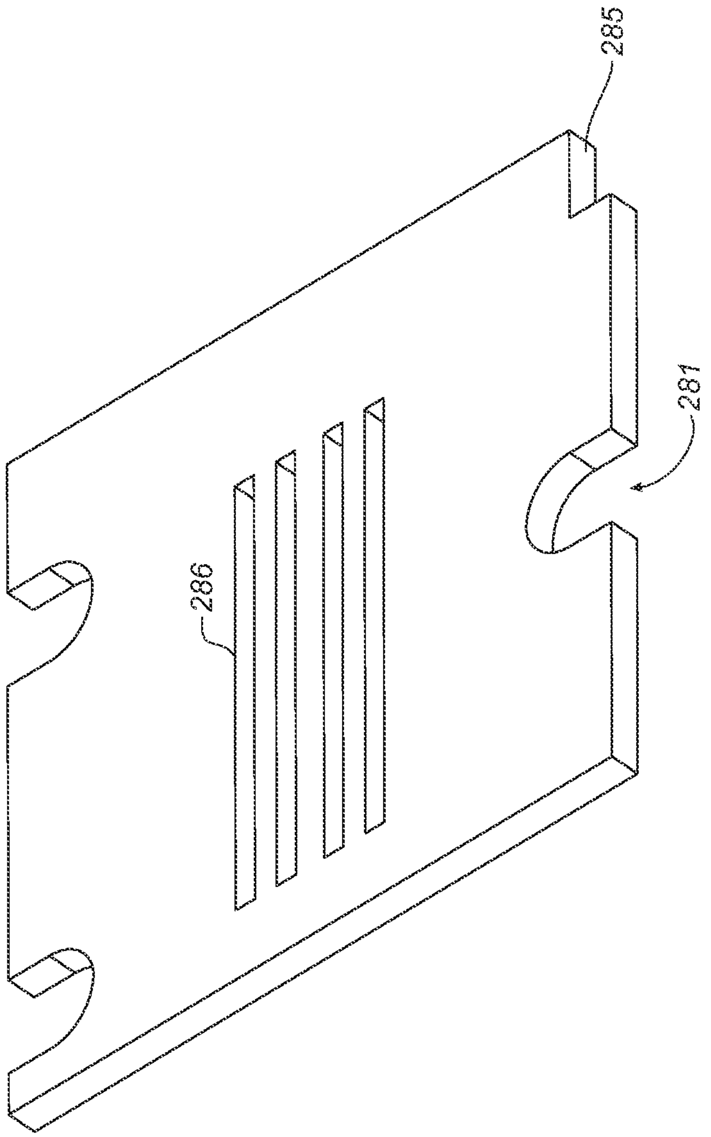
FIG. 19 is a perspective of the optional ink passage layer of the multi-layer mounting substrate of FIG. 17.
Figure 20:
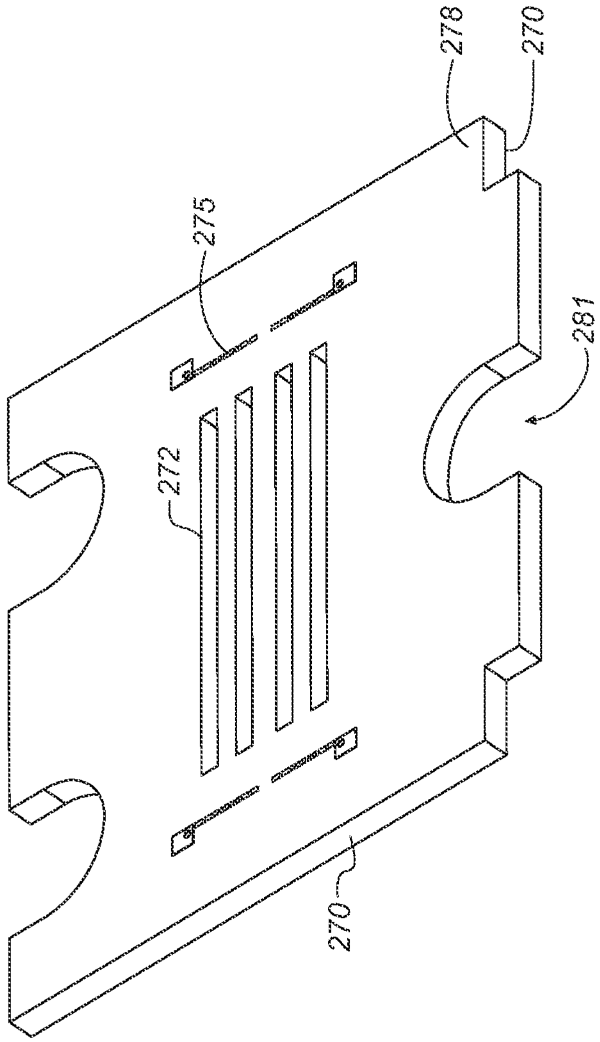
FIG. 20 is a perspective of the metalized layer of the multi-layer mounting substrate of FIG. 17.
Figure 21:
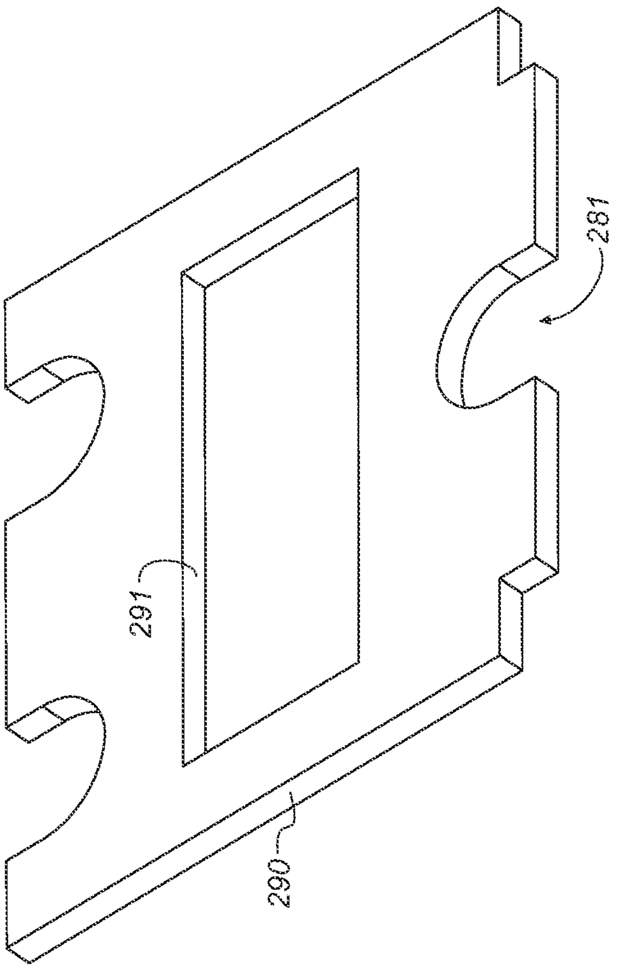
FIG. 21 is a perspective of the face layer of the multi-layer mounting substrate of FIG. 17.

FIGS. 18-20 show perspectives from the same orientation as FIG. 17 of each of the individual layers of multi-layer substrate 230. FIG. 18 shows the base layer 295 including the four inlet holes 296. FIG. 19 shows the optional ink passage layer 285 (or second intermediate layer) including slots 286. FIG. 20 shows first surface 278 of metalized layer 270 (or first intermediate layer) including slots 272 and contact pads 275. Leads 276 (FIG. 10) are not shown in FIG. 20. Connection pads 277 (FIG. 15) are not visible in FIG. 20 because they are disposed on second surface 279. FIG. 21 shows face layer 290 including window 291. Portions of mechanical mounting features 281 are shown for each layer in FIGS. 18-21.

Optional ink passage layer 285 is included in embodiments of multi-layer substrate 230 (FIG. 17) where a desired slot height is greater than a single layer thickness (i.e. the thickness of metalized layer 270) can readily provide. In such embodiments, slots 286 of ink passage layer 285 are aligned with both corresponding ink inlet holes 296 of base layer 295 and corresponding slots 272 of metalized layer 270. In a completed printhead 250 (FIG. 2) the slot (272 or 272 with 286) provides not only a passage for ink from inlet holes 276 to ink feed opening 265 (FIG. 9) of printhead die 251, but also provides storage space for small air bubbles that come out of solution with the ink for example. A larger slot height can provide more storage room for air bubbles without impeding ink flow.

Having described the various features of the multi-layer mounting substrate 230 and the inkjet printhead, methods of fabrication and assembly will next be described. For fabricating the multi-layer mounting substrate 230 (FIG. 17), one or more inlet holes 296 are formed in a first layer 295 (FIG. 18) of a first dielectric material. A plurality of electrical contact pads 275 are patterned on a second layer 270 (FIG. 20) of a second dielectric material. One or more slots 272 are also formed through second layer 270. A window 291 is formed through a third layer 290 (FIG. 21) of a third dielectric material. Second layer 270 is aligned and laminated to first layer 295 such that ink inlet hole(s) 296 is (are) aligned with slot(s) 272. Third layer 290 is aligned and laminated to second layer 270 such that contact pads 275 and slot(s) 272 are exposed through window 291. Typically, first dielectric material, second dielectric material and third dielectric material are all the same dielectric material. For example, the dielectric material can be a typical printed circuit board material such as FR4 or BT or, more generically, a matrix of fibers impregnated by a resin. Alternatively, the dielectric can be a ceramic. Other fabrication steps are chosen to be compatible with the dielectric material. For example, for a printed circuit board material, patterning of contact pads 275 on second layer 270 typically includes masking and etching a copper layer to form contact pads 275, and plating nickel and gold layers over the contact pads 275. Patterning the contact pads 275 can also include patterning a plurality of contact pads 275 on a first surface 278 of second layer 270 and patterning a plurality of connection pads 277 on a second surface 279 opposite the first side. Connection pads 277 can be electrically connected to the plurality of contact pads 275 for example using metalized vias that pass through second layer 270. Electrical leads 276 (FIG. 10) can also be patterned on first surface 278. Window 291 of third layer 290 can be configured to expose contact pads 275, while not exposing at least a portion of electrical leads 276. For the case of using printed circuit board materials, features such as inlet holes 296, slots 272 and 286, mechanical mounting features 281 and window 291 can be formed by drilling or routing for example. The portion of mechanical mounting feature 281 on third layer 290 is formed to have a greater width than the portion on first layer 295. When all the layers 295, 285, 270 and 290 are laminated together, the various portions of mechanical mounting features 281 are aligned with respect to each other.

After such a multi-layer mounting substrate 230 has been fabricated as described above, it is used in the assembly of an inkjet printhead 250. One or more printhead die 251 including a nozzle array 253 (FIG. 8) and an ink feed opening 265 (FIG. 9) is adhesively bonded to second layer 270 such that printhead die 251 is disposed within window 291 (FIG. 14) and each inlet feed opening 265 is aligned with a corresponding slot 272 (FIG. 13) in second layer 270. Adhesive 235 (FIG. 16) for bonding printhead die 251 is dispensed in a pattern to form a fluid seal around inlet feed opening(s) 265 and slot(s) 272. A thickness of third layer 290 is chosen to be the same or substantially the same as a thickness of printhead die 251, so that nozzle face surface 260 (FIG. 8) will be substantially flush with the exterior of third layer 290. Typically, the thickness of printhead die 251 is less than the desired height of slot 272 (or 272 plus 286), so the thickness of third layer 290 is typically less than a height of slot 272 (or 272 plus 286). After adhesively bonding the printhead die 251 to multi-layer substrate 230, wire bonds 252 (FIG. 11) are formed between the bond pads 261 on printhead die 251 and electrical contact pads 275 on second layer 270. An encapsulating material 256 (FIG. 2) is then dispensed, typically as a flowable paste, over the wire bonds 252, the bond pads 261 and the electrical contact pads 275. Then the encapsulating material 256 is cured to form a durable protective covering. A flexible printed wiring member (not shown) is electrically connected to connector pads 277, for example by soldering or using anisotropic conductive film. Typically such electrical connection to the flexible printed wiring member is protected by an encapsulating material (not shown). The flexible printed wiring member is bent around a corner of printhead 250 (FIG. 2) to connect to connector pads (e.g. on connector board 258).

Figure 22:
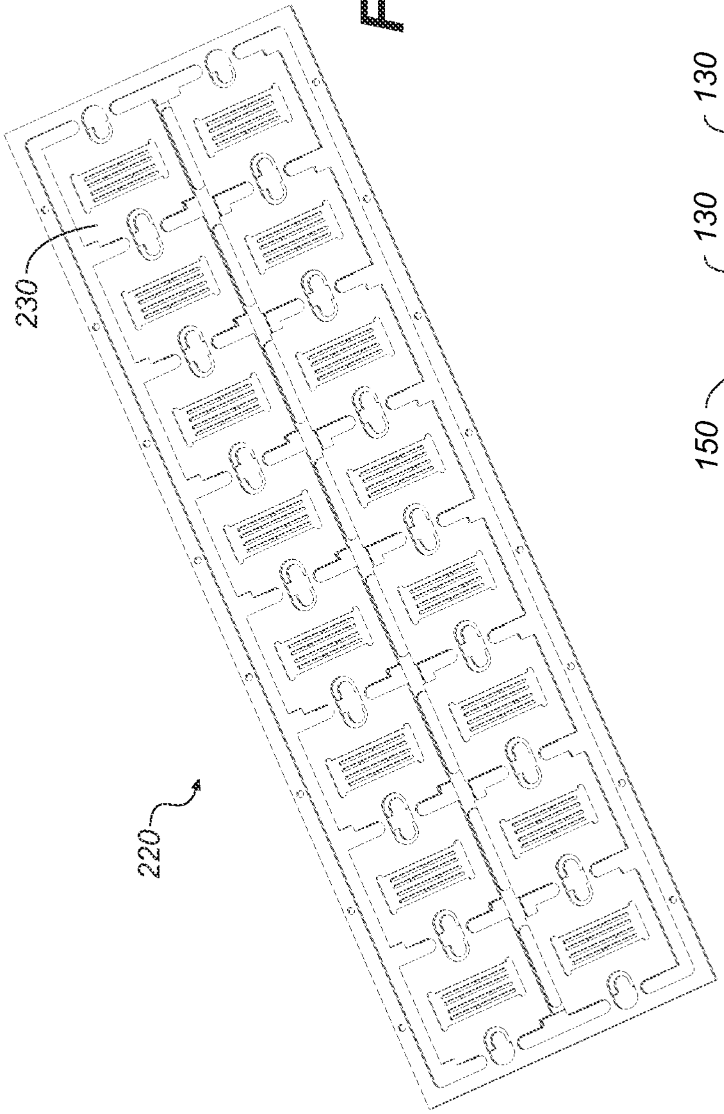
FIG. 22 shows a panel of multi-layer mounting substrates.

Although the figures above have shown the various embodiments as individual multi-layer mounting substrates 230, for low cost manufacturing it is possible to fabricate a group of multi-layer mounting substrates 230 together as part of a multi-layer panel 220 as shown in FIG. 22. In the example of FIG. 22, a panel 220 of sixteen multi-layer substrates 230 that are attached to each other is shown. The multi-layer panel 220 is subsequently separated into individual multi-layer mounting substrates 230. Some of the printhead assembly steps, such as adhesively bonding the printhead die 251, wire bonding, dispensing of encapsulating material 256 and electrical testing optionally can be done while the multi-layer mounting substrates 230 are still attached together as a panel 220.

The invention has been described in detail with particular reference to certain preferred embodiments thereof, but it will be understood that variations and modifications can be effected within the scope of the invention.

PARTS LIST

10 Inkjet printer system
12 Image data source
14 Controller
15 Image processing unit
16 Electrical pulse source
18 First fluid source
19 Second fluid source
20 Recording medium
100 Inkjet printhead
110 Inkjet printhead die
111 Substrate
112 Isolation layer
113 Layer
114 Heater
115 Heater
120 First nozzle array
121 Nozzle(s)
122 Ink delivery pathway (for first nozzle array)
130 Second nozzle array
131 Nozzle(s)
132 Ink delivery pathway (for second nozzle array)
138 Slot
150 Nozzle plate layer
151 Chamber forming layers
152 Chambers
181 Droplet(s) (ejected from first nozzle array)
182 Droplet(s) (ejected from second nozzle array)
200 Carriage
210 Manifold
211 Slot connection end
212 Port connection end
213 Fan-out path
220 Panel
230 Multi-layer mounting substrate
235 Adhesive
240 Insert molded mounting substrate
241 Die mounting portion
242 Slots
243 Die mount surface
245 Extension
246 Alignment feature
247 Alignment feature
249 Mounting substrate
250 Printhead
251 Printhead die (or ejector die)
252 Wire bonds
253 Nozzle array
254 Nozzle array direction
255 Ink inlet ports
256 Encapsulating material
257 Flex circuit
258 Connector board
259 Die bond adhesive
260 Surface (of printhead die)
261 Bond pads
262 Multi-chamber ink supply
264 Single-chamber ink supply
265 Ink feed opening
268 Electrically insulating support
269 Metalized vias
270 Metalized layer
271 Die mounting region
272 Slot
275 Contact pads
276 Leads
277 Connection pads
278 First surface
279 Second surface
280 Extension
281 Mounting feature
285 Ink passage layer
286 Slot
290 Face layer
291 Window
292 Wall
295 Base layer
296 Inlet hole
300 Printer chassis
301 Platen
302 Paper load entry direction
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction (of feed roller)
320 Pick-up roller
322 Turn roller
323 Idler roller
324 Discharge roller
325 Star wheel(s)
330 Maintenance station
332 Cap
334 Wiper
370 Stack of media
371 Top piece of medium
380 Carriage motor
382 Carriage guide rail
383 Encoder fence
384 Belt
390 Printer electronics board
392 Cable connectors

The invention claimed is:

1. A method of assembling an inkjet printhead, the method comprising:

forming an ink inlet hole in a first layer made of a first dielectric material;

forming a plurality of electrical contact pads on a second layer of a second dielectric material;

forming a slot through the second layer;

forming a window through a third layer made of a third dielectric material;

aligning and laminating the second layer to the first layer such that the ink inlet hole is aligned with the slot;

aligning and laminating the third layer to the second layer such that the contact pads and the slot are exposed through the window.

providing a printhead die having:

a nozzle array;

a drop forming mechanism for ejecting a drop through a nozzle in the nozzle array;

a chamber to contain ink near the drop forming mechanism; and an ink feed opening; and adhesively bonding the printhead die to the second layer, such that the printhead die is disposed within the window and the inlet feed opening of the printhead die is aligned with the slot through the second layer.

2. The method of claim 1, wherein the first dielectric material, the second dielectric material and the third dielectric material are all the same dielectric material.

3. The method according to claim 1, wherein patterning a plurality of contact pads on the second layer further includes patterning a plurality of electrical leads connected to the contact pads, wherein at least a portion of the electrical leads are not exposed through the window.

4. The method according to claim 1, wherein adhesively bonding the printhead die to the second layer further comprises forming a fluid seal around the inlet feed opening and the slot.

5. The method according to claim 1, wherein a thickness of the printhead die is the same as or substantially the same as a thickness of the third layer.

6. The method according to claim 1, wherein a thickness of the third layer is less than a height of the slot.

7. The method according to claim 1, the printhead die further including a plurality of bond pads, the method further comprising providing wire bonds between the plurality of bond pads of the printhead die and plurality of electrical contact pads of the second layer.

8. The method according to claim 7 further comprising:

dispensing an encapsulating material over the wire bonds, the plurality of bond pads and the plurality of electrical contact pads; and curing the encapsulating material.

9. The method according to claim 1, wherein patterning a plurality of contact pads on the second layer further comprises patterning a plurality of connection pads that are electrically connected to the plurality of contact pads.

10. The method according to claim 9, wherein the plurality of contact pads are disposed on a first surface of the second layer and the plurality of connector pads are disposed on a second surface opposite the first surface.

11. The method according to claim 9 further comprising electrically connecting a flexible printed wiring member to the plurality of connector pads.

* * * * *